(12) United States Patent
Hauser

(10) Patent No.: US 8,690,133 B1
(45) Date of Patent: Apr. 8, 2014

(54) PERFORATED CUTTING BOARD AND TRAY

(76) Inventor: Peter Edmund Heinrich Hauser, Kirkland, WA (US)

( * ) Notice: Subject to any disclaimer, the term of this patent is extended or adjusted under 35 U.S.C. 154(b) by 0 days.

(21) Appl. No.: 13/480,908

(22) Filed: May 25, 2012

Related U.S. Application Data

(60) Provisional application No. 61/489,907, filed on May 25, 2011.

(51) Int. Cl.
*B23Q 3/00* (2006.01)

(52) U.S. Cl.
USPC ....... 269/13; 269/289 R; 269/302.1; 269/303; 269/315

(58) Field of Classification Search
USPC .............. 269/13, 289 R, 302.1, 303, 315
See application file for complete search history.

(56) References Cited

U.S. PATENT DOCUMENTS

| | | | |
|---|---|---|---|
| 6,715,748 B2 * | 4/2004 | Thompson et al. | 269/289 R |
| 6,722,644 B1 * | 4/2004 | Prosser | 269/289 R |
| D192,341 S | 11/2004 | Goggin | |
| D503,313 S | 3/2005 | Shamoon | |
| 6,910,685 B2 * | 6/2005 | Sellers | 269/289 R |
| 6,994,334 B2 * | 2/2006 | Jones et al. | 269/289 R |
| D615,826 S | 5/2010 | Tsui | |
| D629,268 S | 12/2010 | Shamoon | |
| 7,878,493 B2 | 2/2011 | Shamoon | |
| D638,265 S | 5/2011 | Shamoon | |
| 2009/0146353 A1 * | 6/2009 | Hashim | 269/13 |
| 2010/0194016 A1 | 8/2010 | Tsui | |

OTHER PUBLICATIONS

Pegged Chopping Boards; http://www.trendhunter.com/trends/pego-cutting-board#!/photos/161568/6.
Plastic Chopping Boards; http://www.josephjoseph.com/plastic-chopping-boards/.
Cutting Board/Utility Tray Combo; http://www.prodyne.com/index.php/catalog/product/view/33/5.

* cited by examiner

*Primary Examiner* — Lee D Wilson
*Assistant Examiner* — Shantese McDonald

(57) ABSTRACT

A sanitary, dishwasher-safe perforated cutting board that may enable liquids to pass through, and may be used with or without a fitted tray to facilitate the cutting of meats and rinsed vegetables without the resulting in meat juices and vegetable drippings on the counter. The cutting board may be used as a cutting board or as a cutting board and sieve when placed in a sink for cutting fruits and vegetables in the sink. Bumps found on the bottom of the cutting board or in a fitted tray may create a rigid cutting surface while providing channels through which liquids can pass. These bumps may enable the cutting board to be flexible, yet rigid when placed on a flat surface.

6 Claims, 4 Drawing Sheets

PERFORATED CUTTING BOARD AND TRAY

RELATED DOCUMENTS

This application claims priority to, and benefit of, U.S. Provisional Application No. 61/489,907, filed May 25, 2011, entitled Cutting Board Apparatus, which is incorporated herein by reference in its entirety.

FIELD OF THE INVENTION

This invention relates to kitchen and cooking tools, more specifically cutting boards and sieves.

BACKGROUND OF THE INVENTION

Numerous types of cutting boards have been devised to channel liquids away from the food that are released when cutting, for example, wet fruits and vegetables or when cutting poultry and meats that secrete juices. Some of these include special containers into which the juices are funneled. Others simply store the liquids inside the grooves cut into the boards.

Some cutting boards have non-porous surfaces so that they do not trap dirt and bacteria.

Similarly, sieves and colanders are also used in cooking. These devices may be used to drain liquid from cooking ingredients or mixtures. Some colanders are made of silicone material and are flexible, others are made of solid materials such as metals and plastics. None, however, are designed to be used as a cutting surface.

A person preparing food typically must use a cutting board for cutting, then use a colander or sieve to wash and/or clean the ingredients. This process is inefficient because it requires two steps and takes extra time and may lead to a wet countertop from the water and/or juices that drip from the food that is being cut.

Cutting boards, sieves, and colander devised to-date tend to serve a single function. Either they serve as a colander, or a cutting board, but not both. Furthermore, users are forced to cut their meats, and then pour them into a colander that is placed on top of a bowl in order to catch the drippings. This is both inefficient, and increases the amount of cleaning that must be performed with each meal.

SUMMARY OF THE INVENTION

The perforated cutting board solves the problem of managing liquids that escape from fruits, vegetables, meats, and other foods while being cut by enabling the liquids to pass through the cutting surface into a reservoir, sink, fitted tray, etc. that is placed beneath the perforated cutting surface.

DETAILED DESCRIPTION

In an embodiment, a cutting board enables the juices, drippings, water, and other liquids to pass through the cutting surface and into either a specially designed tray, or into a saucepan thus eliminating the countertop mess, and enabling the captured liquids to be used in sauces, soups, etc. The invention also can be used as a cutting surface for use inside a sink, thus letting the liquids pass through the cutting surface and down the drain while retaining a rigid cutting surface.

Accordingly, besides the objects and advantages described above, several objects and advantages of an improved cutting board may include:
a. to provide a cutting board/surface that can be placed inside a sink for cutting foods while simultaneously rinsing them;
b. to provide a cutting board/surface available as a standard item in multiple colors that represent the food that is being cut (e.g. fruits, vegetables, poultry, and meat;
c. to provide a cutting board/surface with a fitted tray that captures the liquids that pass through the cutting surface for later use in sauces, soups, etc.;
d. to provide a cutting board/surface that can be washed in the dishwasher and is easily sanitized for food preparation;
e. to provide a cutting board/surface that is flexible enough to be used to funnel foods into a container while being rigid enough to cut meats and harder products when placed on a flat surface.

Figure 3:
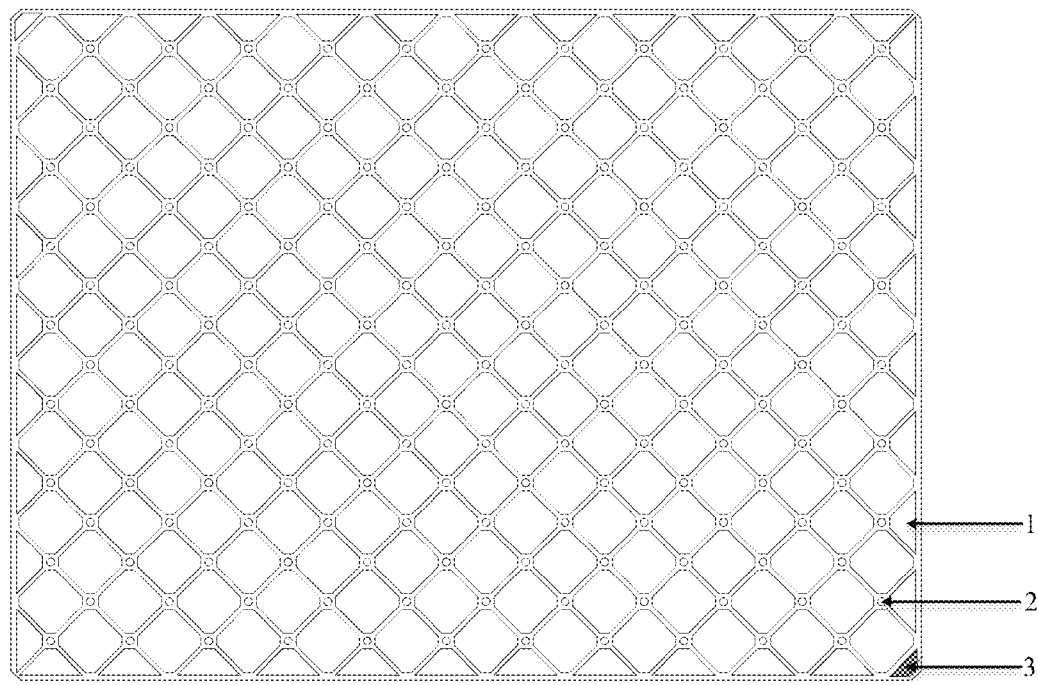
FIG. 3 shows a diagrammatic bottom view of a cutting board including holes, stiffening bumps, and a spout.
Figure 4:
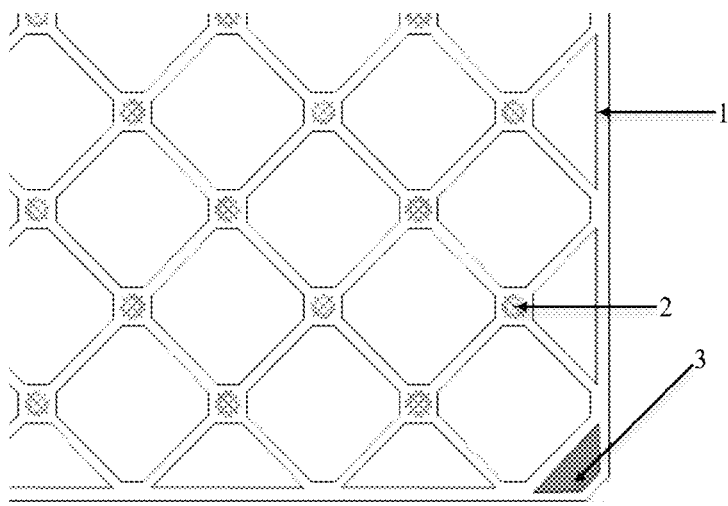
FIG. 4 shows a zoomed-in bottom view of a cutting board including holes, stiffening bumps and a spout.
Figure 5:
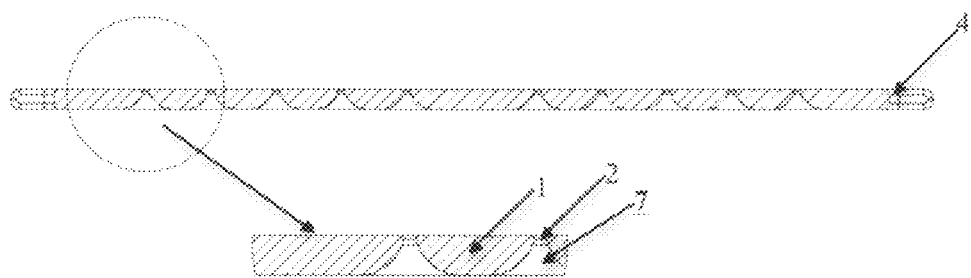
FIG. 5 shows a side view of a cutting board including holes and stiffening bumps and gaps between stiffening bumps that may interlock with drainage bumps in the inner surface of the tray.

One embodiment of a perforated cutting board and tray may be illustrated as shown in FIG. 3 (top view) and FIG. 5 (side view). In this embodiment, the cutting board is equipped with stiffening bumps [1] that serve as standoffs on a flat cutting board tray. This enables liquids to pass between the bumps and into channels.

Figure 1:
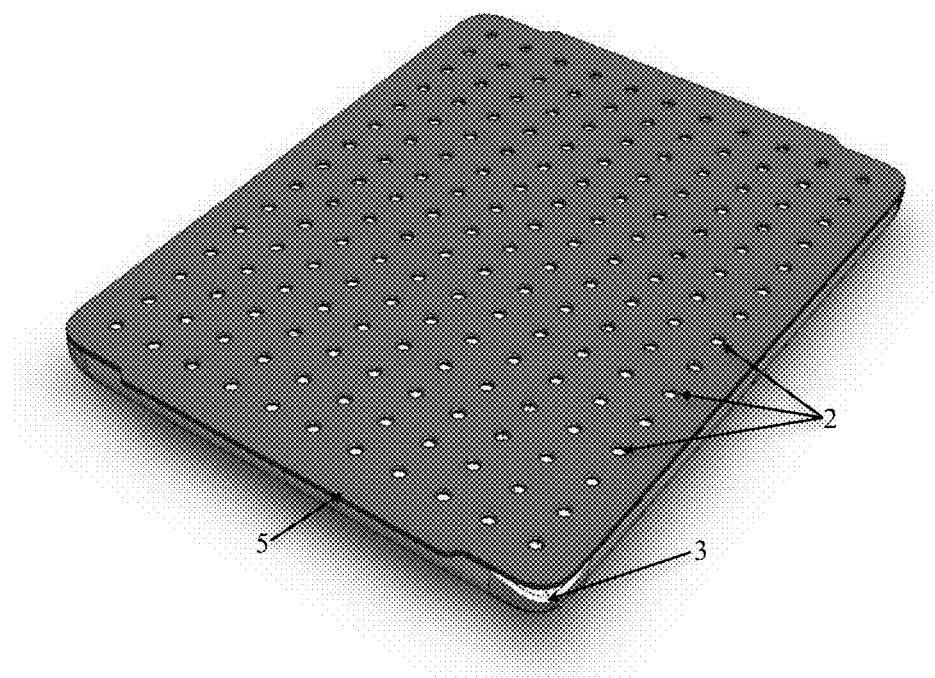
FIG. 1 shows a perspective view of a perforated cutting surface of a cutting board and tray.
Figure 2:
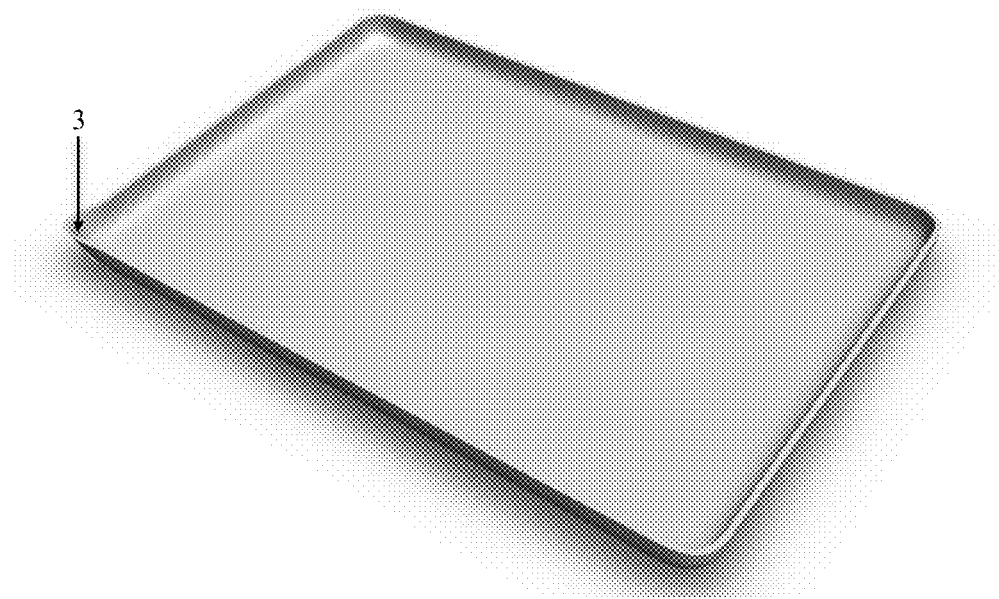
FIG. 2 shows a perspective view of a tray and spout.
Figure 6:
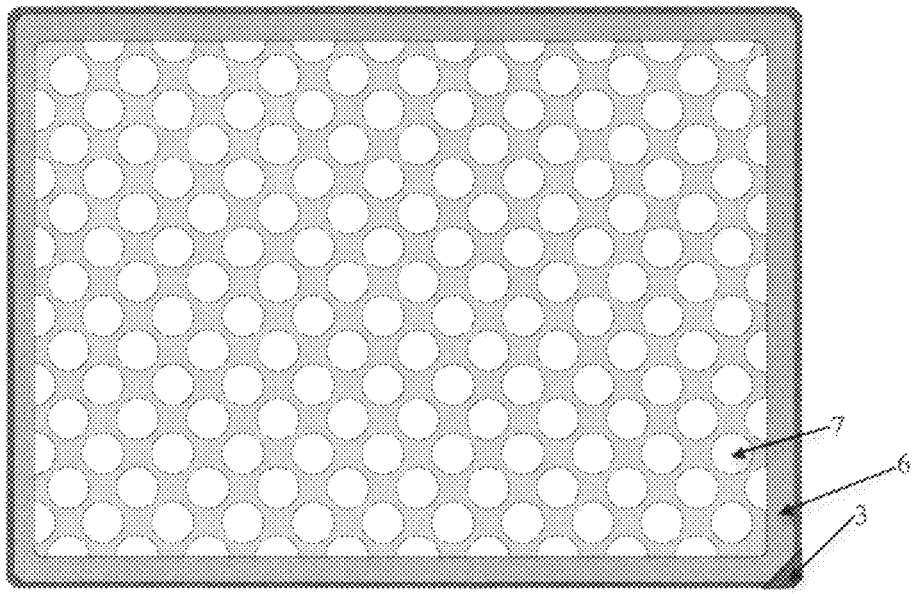
FIG. 6 shows an embodiment of a cutting board tray for a flat, flexible perforated self-draining cutting board.
Figure 7:
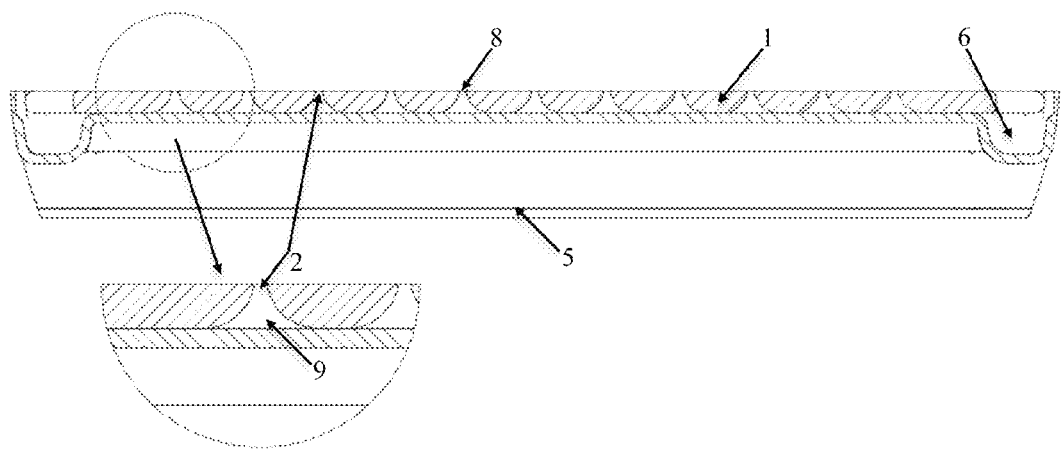
FIG. 7 shows a side view of an embodiment of a self-draining cutting board and tray assembly.

Another embodiment of a cutting board for use on or inside a standard flat tray or on a countertop may be illustrated as shown in FIG. 1 (perspective view of the cutting board on a tray) and FIG. 2 (perspective view of a tray that could be used with the cutting board), and in FIG. 6 (cutting board tray for flat, flexible self-draining cutting board) and FIG. 7 (side view of the flexible perforated cutting board and tray assembly).

FIG. 7 shows liquid channels [9] that may be created by the cutting board's bumps [1] and may be used to trap liquids that pass through the drain holes [2] in the perforated cutting board. When placed on a flat surface with the bumps [1] touching the bottom surface, the bumps [1] serve as standoffs for the cutting surface and the tray, and are spaced sufficiently far apart to form channels through which liquid can flow. In some embodiments, a cutting board may be placed inside a tray for collecting liquid. The liquid may then be poured-off (for example when the cutting board is used with the specially designed tray shown in FIG. 2) or may flow down the drain (for example when the cutting board is used in a sink).

In some embodiments, the cutting surface may be shaped to facilitate the draining of liquid. For example, the cutting surface may be concave, convex, sloped, or any other shape so as to direct liquid away from food for subsequent drainage and removal. For example, the cutting surface may be shaped to direct liquid through holes in the cutting surface, or to direct liquid over an edge of the cutting surface, etc.

In some embodiments, the cutting surface may be comprised of a material with certain localized surface properties known to either attract or repel liquids. For example, certain areas surrounding each drainage hole may exhibit hydrophilic properties so as to direct liquid toward the hole. In this example, the remaining areas may exhibit hydrophobic properties so as to repel and further direct liquid toward the hole.

High-temperature silicone or other high-friction, flexible material may be used when molding the specialized tray, though other materials such as metal, wood, glass, or rubber may also be used. This may enable the tray to be placed on a warm surface without damage to the surface or tray. A flexible material may also facilitate pouring once the process of cutting and trapping the liquids (e.g. drippings) by enabling the tray to be bent to create a funnel-like shape.

In another embodiment of the cutting board, the Drainage Tray may provide rigidity for a thin cutting surface through its raised platform and self-drainage bumps [7] as shown in FIG. 6.

Operation

When used with a standard tray as shown in FIG. 1, the user may place the cutting board as shown in FIG. 3 into the associated tray or any other flat surface. The flat surface provides a stable base on which the cutting surface can rest. The stiffening bumps [1] on the cutting board's bottom surface may provide rigidity to the thin cutting board surface [4] and the cutting surface may remain completely flat as shown in FIG. 5.

In another embodiment of the invention, when used with the tray in FIG. 6, the drainage bumps [7] are molded into the tray and may serve both as a method for distributing the surface load, and drain channels [6] capture and direct the liquid towards the pour spout [3] at one corner of the tray. This enables a simpler cutting board design to be used—such as one that has drain holes [2] but no stiffening bumps [1]. As soon as the user has completed the cutting process, he or she can remove the cutting board, rinse it, or place it into the dishwasher.

Any liquids gathered during the cutting process may be poured-off by, for example, lifting the tray, bending it slightly, and pouring out the liquids from the spout [3] at the corner of the tray. This may be accomplished without removing the cutting board because both it and the fitted tray are flexible. The flexible cutting board sits firmly inside the outer walls of the tray as shown in FIG. 7, and thus when the tray flexes, it flexes the cutting board as well. Furthermore, the liquid may drain freely towards the pour spout [3] through the channels [9] formed by the spaces between the bumps [1].

In one embodiment, the stiffening bumps of the cutting board [1] and the interlocking drainage bumps of the tray [7] may be spaced in a regular pattern such that the drainage bumps of the tray [7] are placed precisely at the center of the space between the drainage holes [2] in the cutting board. This placement at the center of the space between the regularly spaced holes [2] may ensure that liquids that drip through the drainage holes [2] may flow in an unobstructed manner while providing an interlocking fit to enhance the stiffness of the flexible top cutting surface. As is evident in FIG. 6, liquids may pass from the top surface through the drainage holes [2] to the tray. The interlocking drainage bumps [7] separate the tray from the cutting board, thus creating space for the liquid to flow and creating a drain channel [6]. The liquid may then pass from the tray to the drain channel [6], and, if the pour spout [3] is oriented downwards, liquid may flow out the spout.

In another embodiment, the stiffening bumps [1] may be spaced in an irregular pattern that generates a nice design, while maintaining the flexible characteristics of the tray.

The bumps [1] may also serve to distribute the load created on the cutting surface. They may do this by presenting a broad, flat connection with the cutting board's bottom surface. The bumps [1] [7] may be either attached to the cutting board as shown in FIG. 5 or to the tray as shown in FIG. 6. In order to ensure proper cutting, the bumps may be aligned closely with each other to create a uniform distribution of the cutting load. In order to facilitate drainage, the holes may be large enough to accommodate the desired drainage level while being small enough to allow placement of the bumps and to provide a flat surface for cutting.

For example, in this embodiment, holes [2] may be ⅛" in diameter and may be placed between ½" and 1" apart (depending on the height of the bumps [1]) in a regular pattern with bumps placed at the precise center between the holes to facilitate both drainage and to provide a flat, rigid cutting surface.

Different materials, hole sizes, and bump heights and sizes may be selected to provide the best possible drainage and the appropriate cutting surface rigidity for different types of food. For example; drainage holes [2] may be chamfered in order to reduce the probability of catching solids that may land on the cutting surface. The bump shapes [1] [7] may vary in shape and size depending on the size, thickness, and material of the cutting board and tray. The material chosen may be optimized such that it offers enough stiffness to cut heavy objects such as meat roasts, while offering enough draining to enable the juices to pass and sufficient flexibility to bend, etc. Another material may be chosen to optimize the cutting of vegetables in a sink. Such a material may be more flexible, with smaller holes and smaller, more closely placed bumps that enable water to pass while being more flexible for use in a sink.

For example, a more flexible material may require bumps to placed more closely together than would a stiffer material because it is compliant and flexes more under the pressure of a knife. The thickness of the material may also affect the quantity and size of the bumps needed to facilitate the use as a cutting board while still enabling sufficient drainage. For example, a more flexible material may require thinner, more closely spaced bumps to reduce flexing under the pressure of a blade. In general, a stiffer material may require fewer, more widely spaced bumps than would a more flexible material.

When used in a sink, liquids may pass from the cutting surface [4] of the cutting board, through the drain holes [2] into the sink below, thus allowing the cutting surface to remain wholly or partially devoid of liquids. When used with a tray, liquids may be trapped in the tray and poured-off later.

In one embodiment of the invention, for example, the bumps may be designed to contact each other through the inclusion of interlocking ridges on either side of the bump [1]. In this manner, when placed on the flat surface, the ridges on either side of the bump create a stiff surface that may only flex in one direction. Thus the cutting board can be rolled-up, washed, etc. while still enabling liquid to pass through the drainage holes.

The rigidity, when placed on a flat surface, offers the user the best possible cutting surface, while the flexibility enables the use of the cutting board in concave surfaces such as sinks. Flexibility in one direction may also simplify cleaning by creating a greater separation between the bumps when the cutting board is rolled in the direction of greatest flexibility, yet by providing rigidity in the designated direction of the blade for cutting.

SUMMARY, RAMIFICATIONS, AND SCOPE

Accordingly, the person of ordinary skill will understand that the cutting board may provide certain benefits including but not limited to:

a. Trapping drippings for later use while carving meat or poultry,
b. Trapping water while cutting fruits and vegetables so as to keep the food preparation surfaces clean,
c. Rinsing fruits and vegetables while cutting them in a sink safely without damage to the knife or sink,
d. Easy pouring and/or funneling of cut foods and of the resulting drippings,
e. Color coding the cutting surface for sanitary purposes,
f. Easy cleaning of the non-porous cutting surface in the dishwasher, and
g. A stiff cutting surface when laid flat, but flexible enough to use as a funnel or colander or to be rolled for easy cleaning.

Various embodiments have been described in this document, however these embodiments are not intended to limit the scope of the invention, which is clarified by the following claims.

What is claimed is:

1. A cutting board assembly comprising: a flat top surface comprising perforations that enables liquids to pass through; a bottom surface including a plurality of stiffening bumps that maintain the top surface in spaced relation to the bottom surface; whereby the cutting board is made from a flexible material; and a set of channels, defined by spaces between the stiffening bumps and the perforations enable liquids to flow beneath the secondary surface and also serve to stiffen the top cutting surface.

2. The cutting board assembly defined in claim 1, wherein said cutting board assembly includes a fitted tray.

3. The cutting board assembly defined in claim 2, wherein said fitted tray includes a pour-spout for pouring collected liquids without removing the cutting board.

4. The cutting board assembly defined in claim 2, wherein said fitted tray has drainage bumps that direct liquids towards a liquid-collecting trough.

5. A cutting board assembly comprising: a flexible flat top surface comprising perforations that enables liquids to pass through; a bottom surface including a plurality of stiffening bumps that maintain the top surface in spaced relation to the bottom surface; and a tray including an inner surface containing a plurality of drainage bumps that maintain the cutting board in spaced relation to the inner surface of the tray; and a set of channels wherein said cutting board assembly channels are defined by the drainage bumps integrated into inner surface of the tray that interlock with matching stiffening bumps on the bottom-surface of the cutting board to provide rigidity to the top cutting surface.

6. The cutting board assembly defined in claim 5, wherein said fitted tray includes a pour-spout for pouring collected liquids without removing the cutting board.

* * * * *